Oct. 10, 1944.  L. F. FINK  2,359,754
PLURAL PARKING SPACE METER
Filed June 26, 1942  8 Sheets-Sheet 1
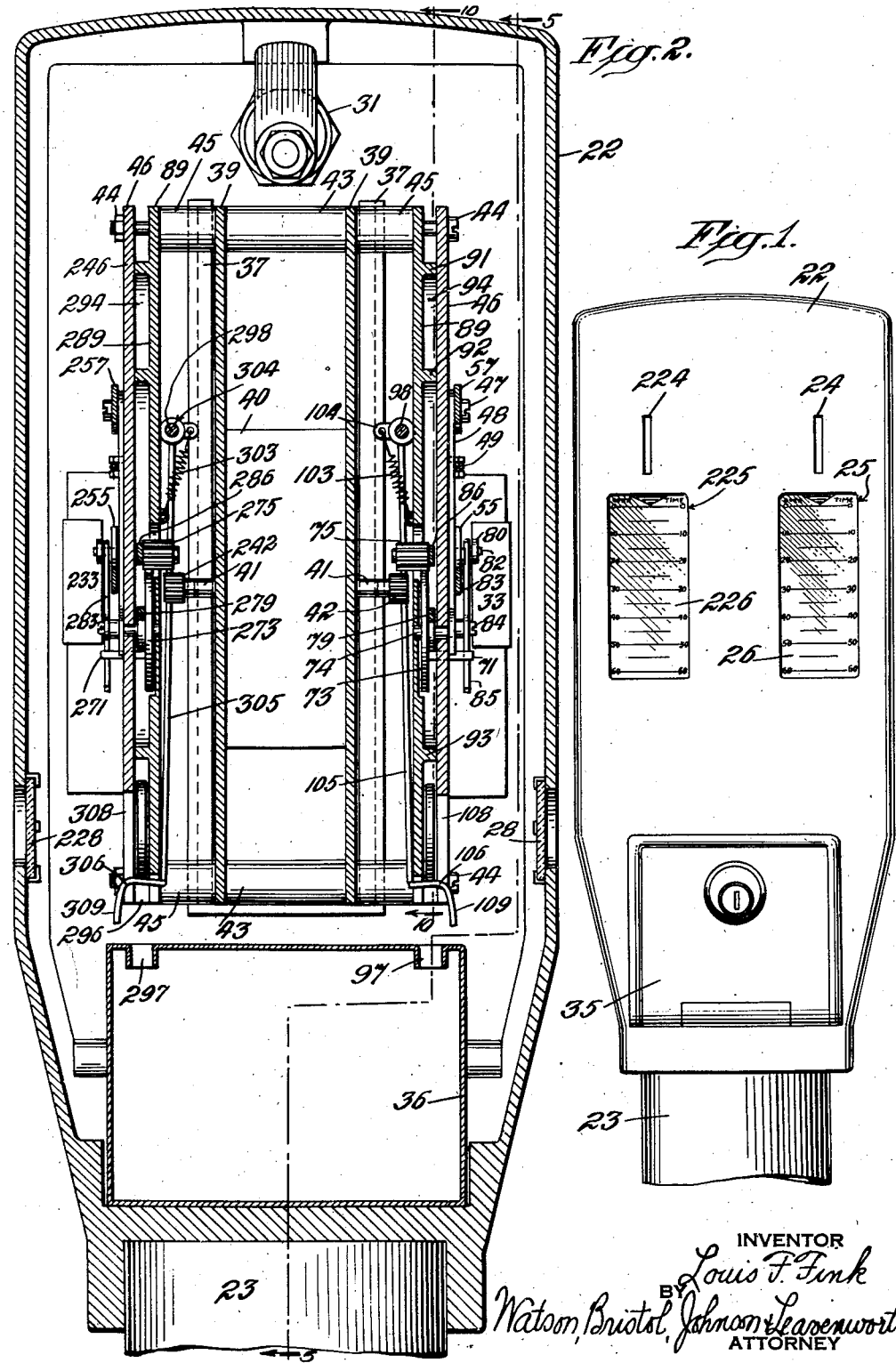

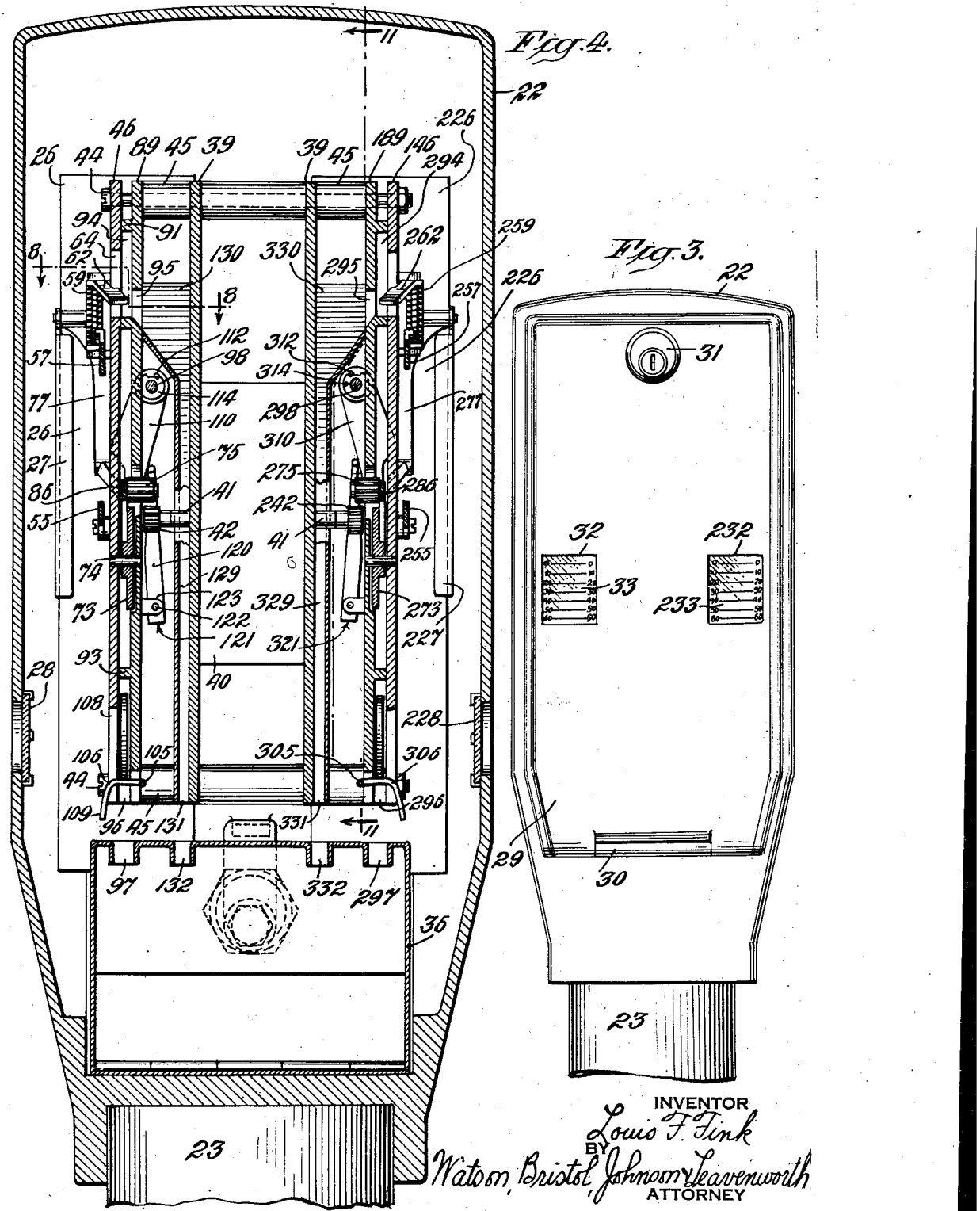

Oct. 10, 1944.   L. F. FINK   2,359,754
PLURAL PARKING SPACE METER
Filed June 26, 1942   8 Sheets-Sheet 3
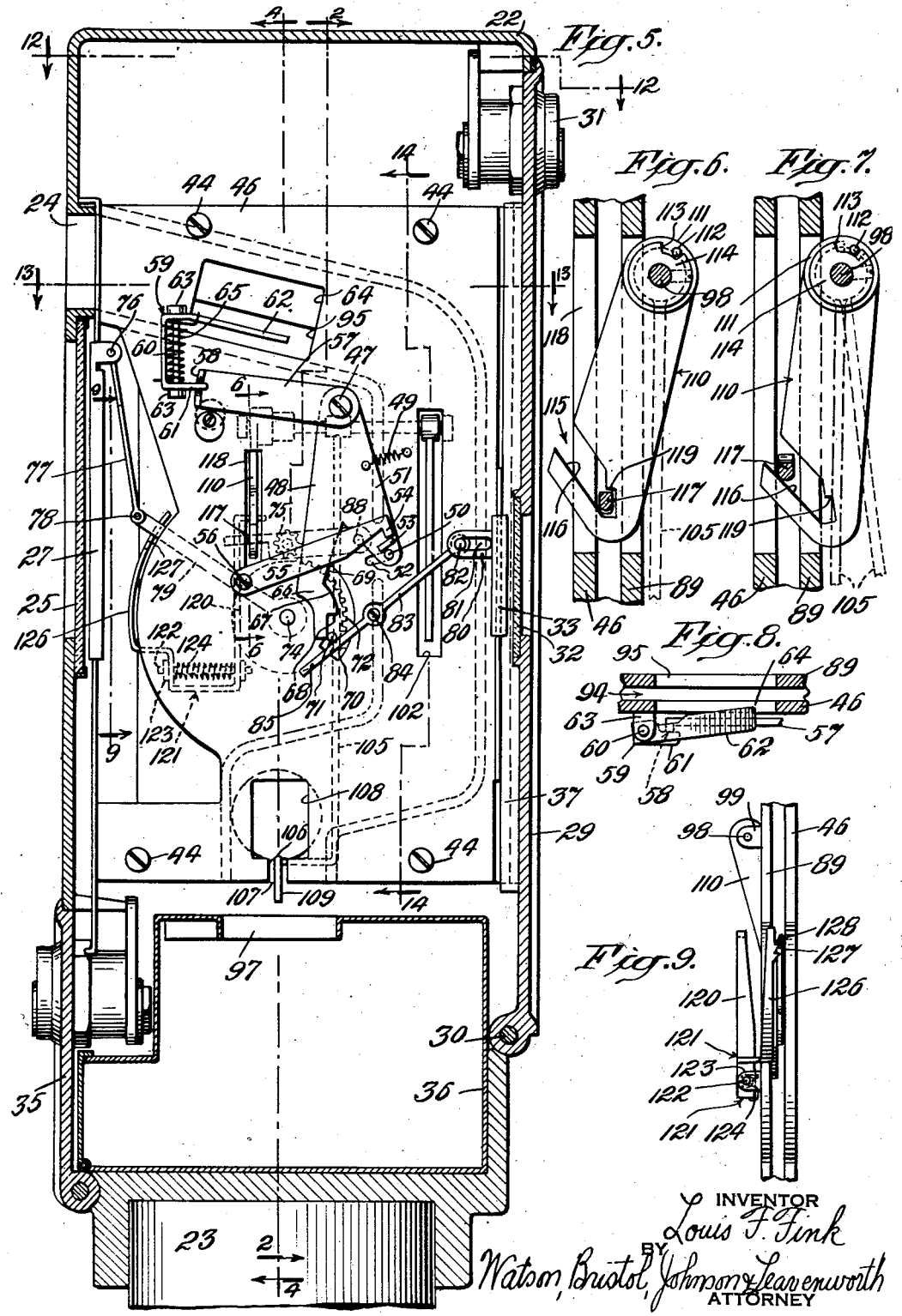
INVENTOR
Louis F. Fink
BY Watson, Bristol, Johnson & Leavenworth
ATTORNEY

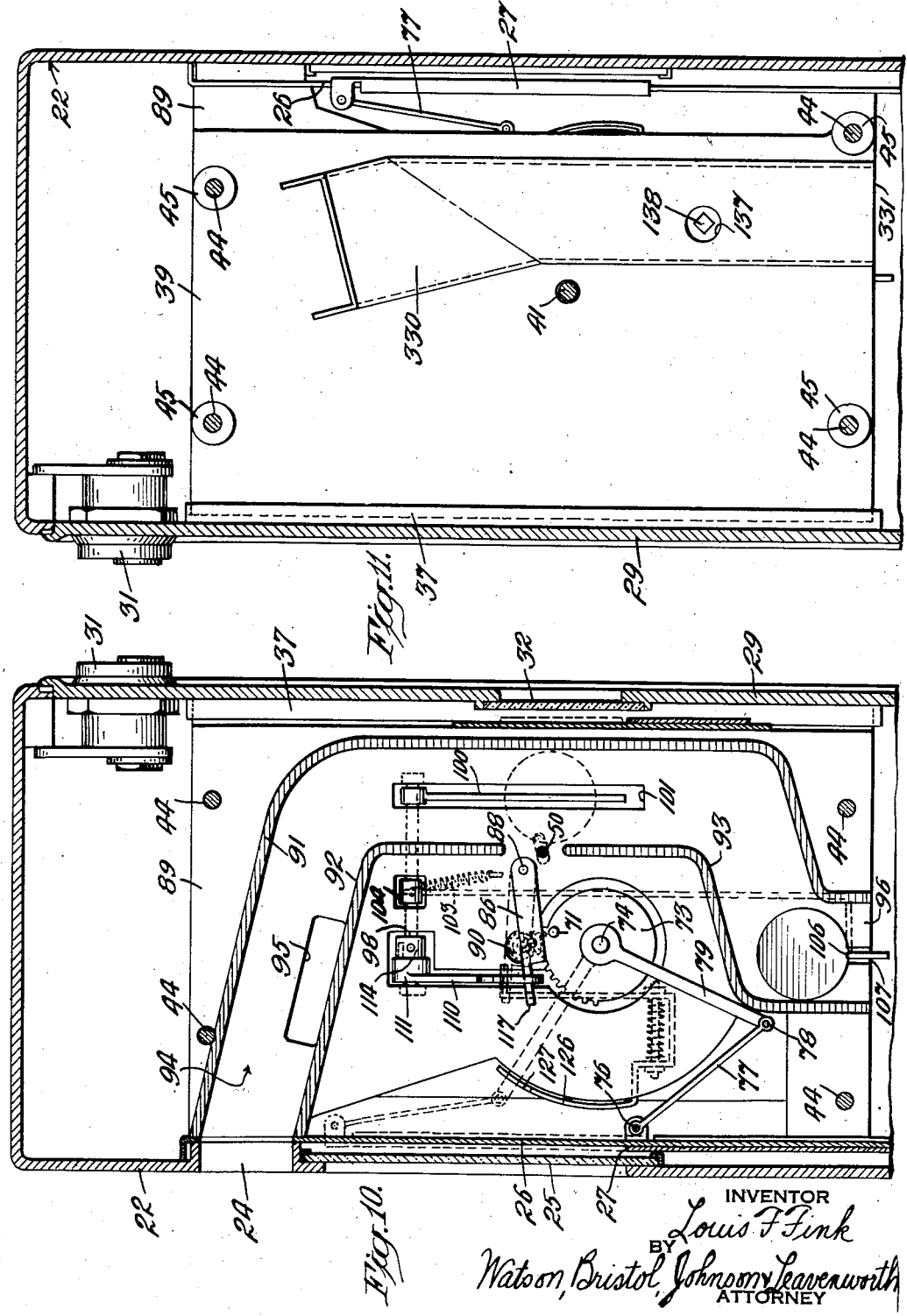

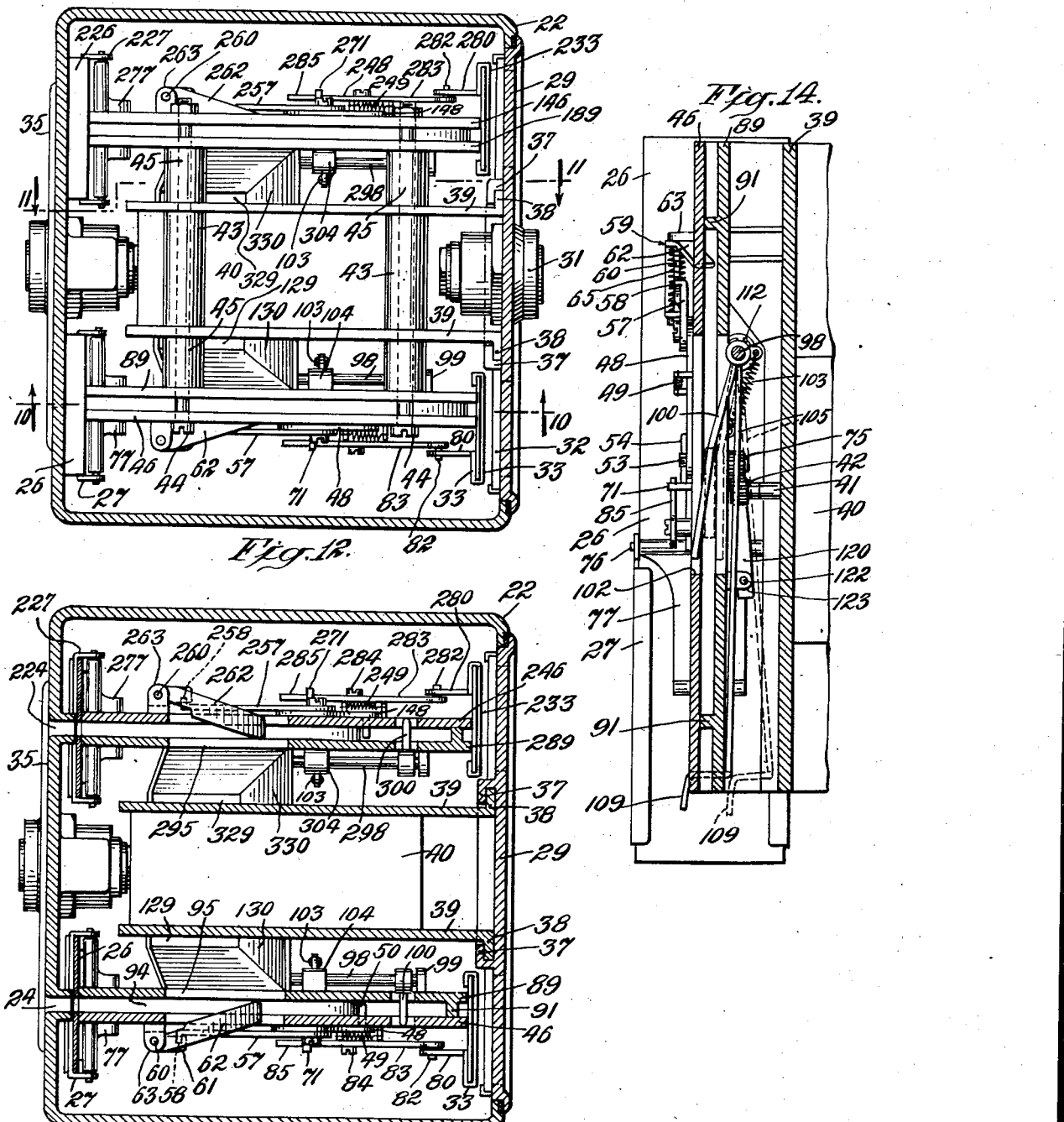

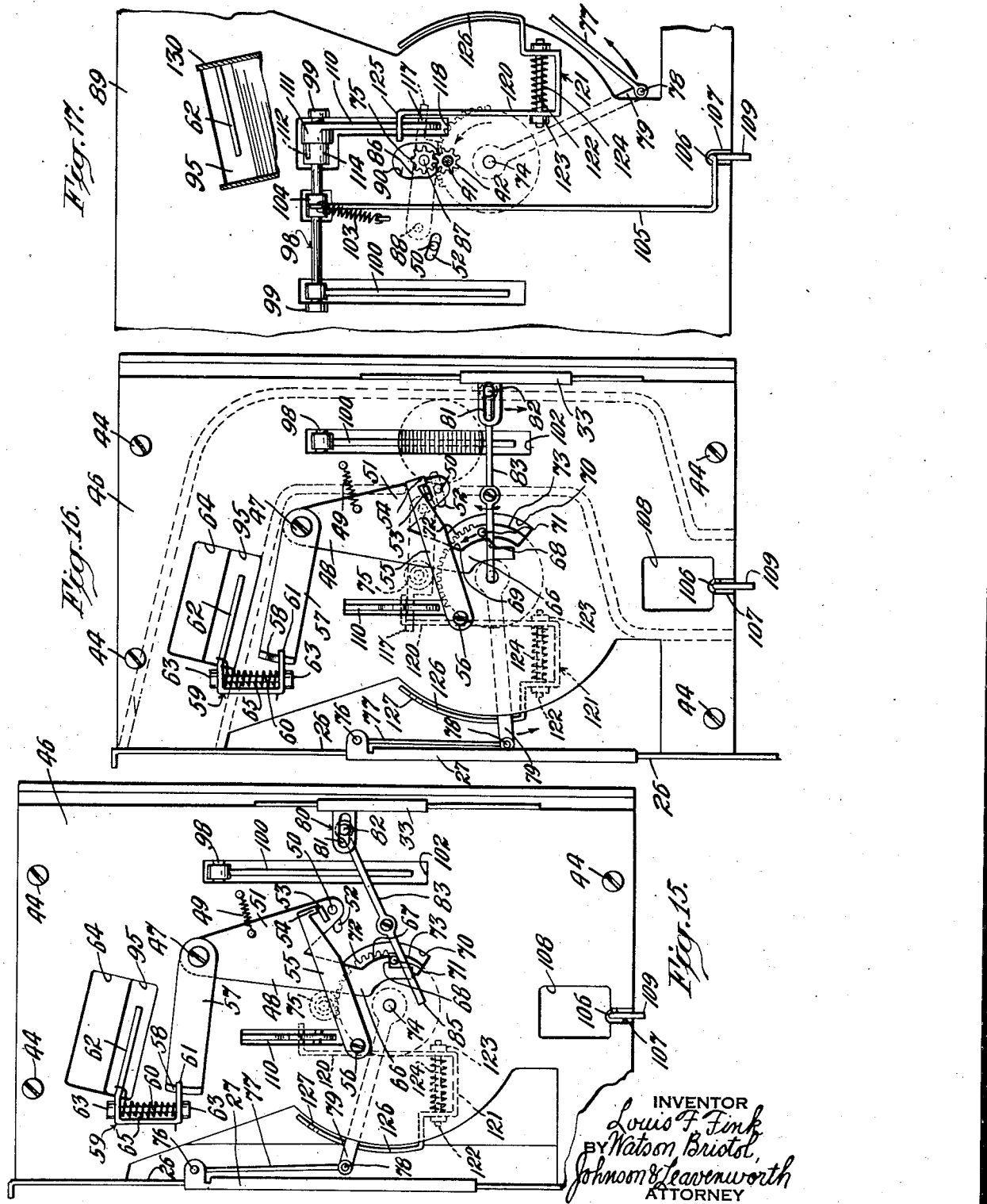

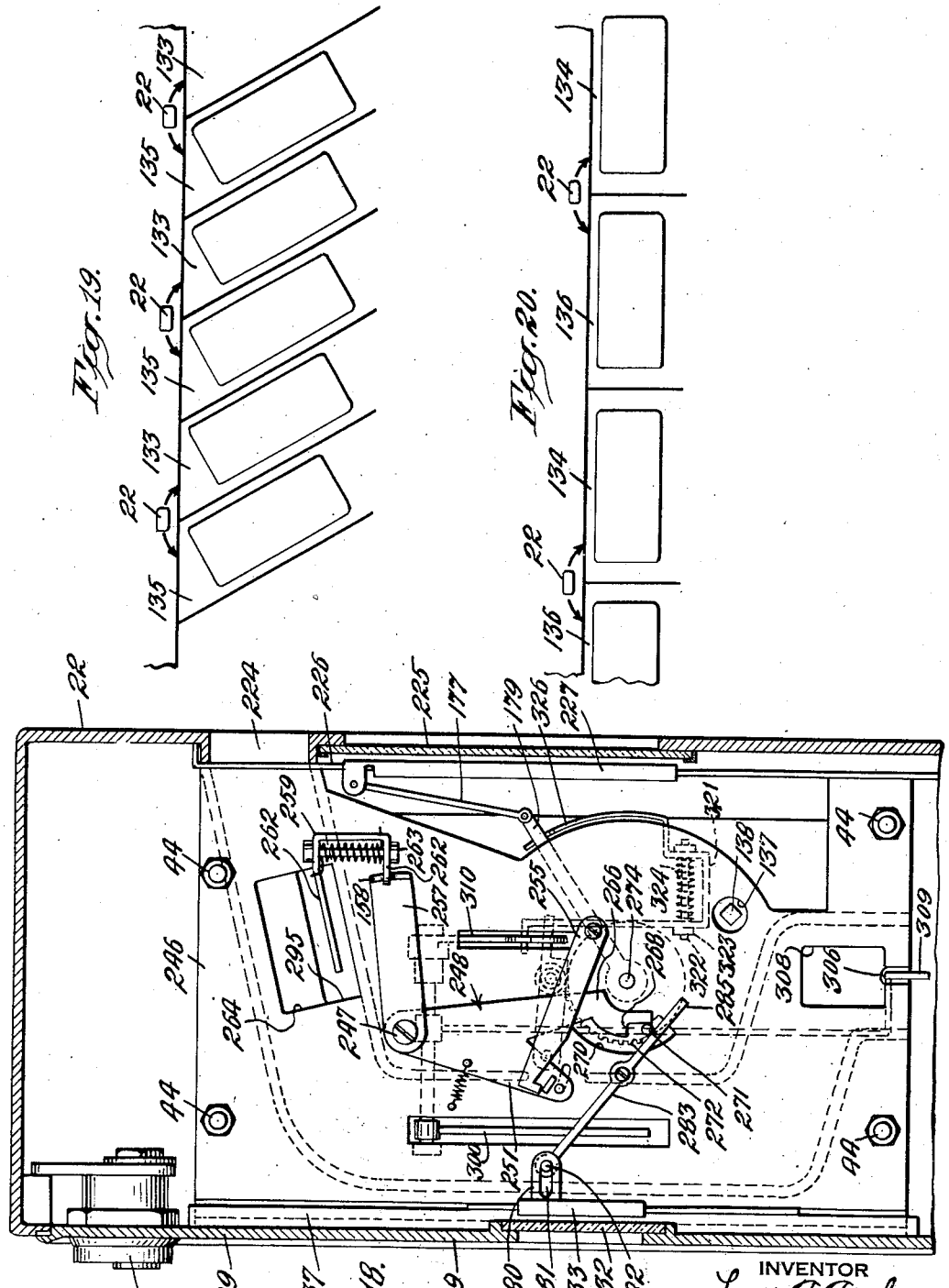

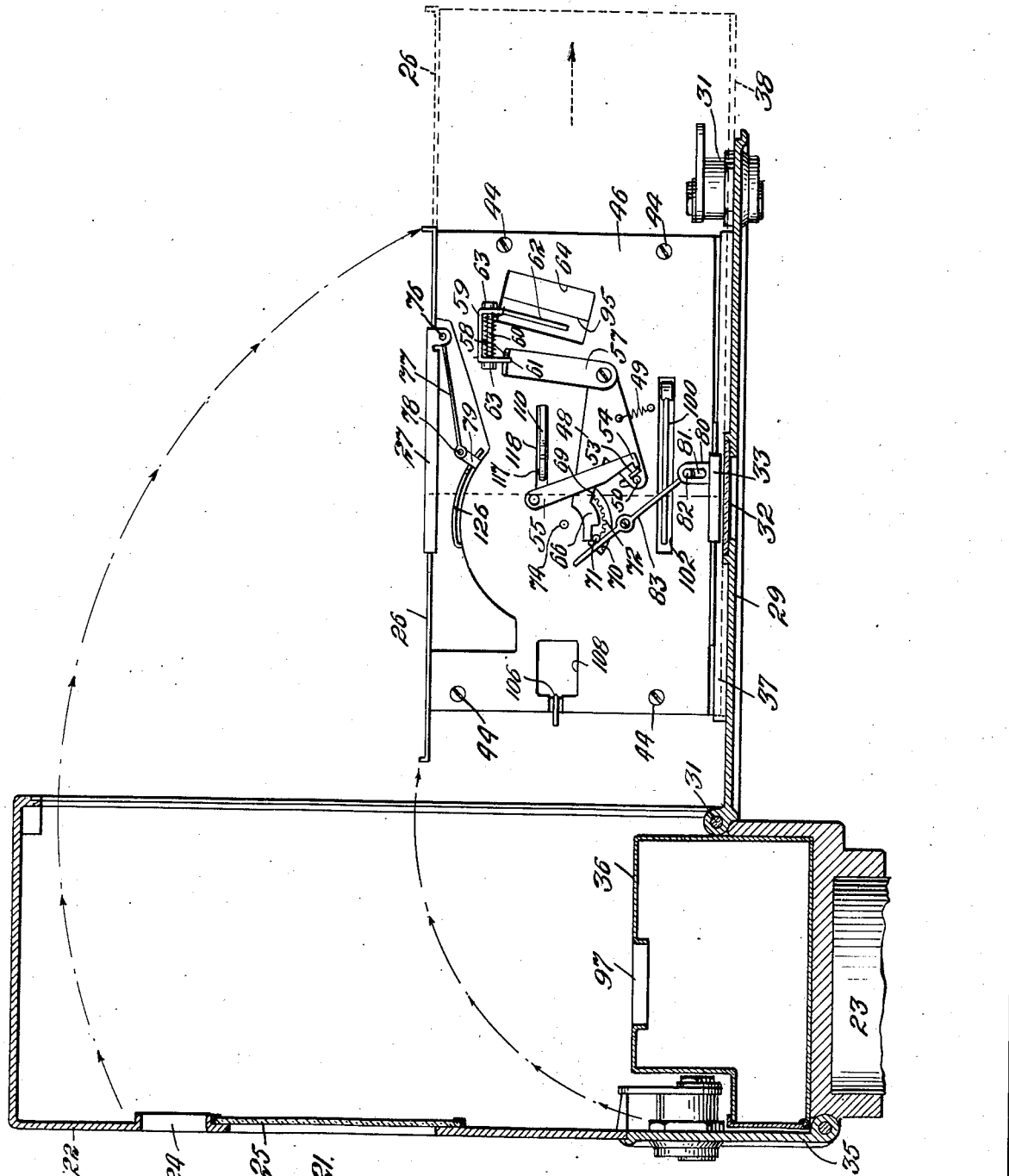

Patented Oct. 10, 1944

2,359,754

UNITED STATES PATENT OFFICE 2,359,754

PLURAL PARKING SPACE METER

Louis F. Fink, New York, N. Y., assignor to International Meters, Inc., New York, N. Y., a corporation of New York Application June 26, 1942, Serial No. 448,553

7 Claims. (Cl. 194—45)

The present invention relates to car parking meters and, more particularly, to such a device adapted for control of at least two adjacent parking spaces.

A general object of the present invention is the provision of an economical plural parking space meter which effectively and accurately controls independent parking in at least two adjacent parking spaces while reducing to at least one-half the normal number of units and supporting posts needed and in which at least two coin-controlled time interval indicators are independently operated at certain speed from a common power unit in accordance with proper manipulation and/or coin deposition by the person desiring to use the particular parking space with which a certain one of the aforesaid coin-controlled time interval indicators is associated; and whereby in addition to effecting an important and large economy in cost of equipment and installation, time and cost of servicing, maintenance, policing of and collection from such units is materially reduced. Furthermore, by this means the appearance of so-equipped streets is greatly enhanced accompanied by a very important advantage in that fire hazard is greatly reduced due to the fact that such meters and their supports provide an increased spacing apart of, say, twice the distance the usual single meters are located from each other.

More specific objects of the invention are the provision of such a plural parking space meter for control of at least two adjacent parking spaces which comprises a single casing having at least a pair of indicator windows therein in which at least a pair of movable time interval indicators are adapted each to be exposed in one of the windows for separate control of its designated parking space, a single power unit from which at least two separate speed-controlled mechanisms are to be independently operated in accordance with the deposition of coins in a particular slot and its associated chute of the plurality thereof with which the casing is equipped, one for each parking space, with the mechanisms each independently causing operation of the particular indicator associated therewith without affecting any other indicator, and a single coin collection means in the casing to serve all of the chutes; and to provide structural embodiments of the device which are readily constructed and allow efficient use and operation thereof.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 1 is a front elevational view of an embodiment of a twin parking meter of the present invention showing it mounted upon a standard, a part of which is broken away;

Fig. 2 is a vertical sectional view of the structure shown in Fig. 1 and taken from the front side on a line 2—2 of Fig. 5;

Fig. 3 is a back elevational view of the structure shown in Fig. 1;

Fig. 4 is a view similar to Fig. 2 except that it is taken from the opposite direction and on a line 4—4 of Fig. 5;

Fig. 5 is a vertical sectional side view of the structure shown in Fig. 2 taken substantially on line 5—5 thereof;

Fig. 6 is an enlarged vertical transverse sectional view with parts broken away of declutching gear actuating lever structure taken substantially on line 6—6 of Fig. 5;

Fig. 7 is a view similar to Fig. 6 of the same structure shown therein with parts in different positions;

Fig. 8 is a fragmentary horizontal sectional view taken on a portion of line 8—8 of Fig. 4 and showing a coin diverting lever in non-diverting position;

Fig. 9 is a fragmentary vertical transverse sectional view taken substantially on line 9—9 of Fig. 5;

Fig. 10 is a vertical sectional view with parts broken away taken substantially on line 10—10 of Figs. 2 and 12;

Fig. 11 is a vertical sectional view with parts broken away taken substantially on line 11—11 of Figs. 4 and 12;

Fig. 12 is a horizontal sectional view taken on line 12—12 of Fig. 5;

Fig. 13 is another horizontal sectional view taken substantially on line 13—13 of Fig. 5;

Fig. 14 is a vertical transverse sectional view with parts broken away taken on line 14—14 of Fig. 5;

Fig. 15 is a view similar to Fig. 5 with parts including the casing omitted and broken away and showing certain operative parts in different functioning position, the so-called "penny position";

Fig. 16 is a view similar to Fig. 15 showing operative parts in different position, approaching the so-called "nickel position";

Fig. 17 is a vertical sectional view with parts broken away of structure shown in Fig. 16 but taken from the opposite side of the structure therein shown;

Fig. 18 is a view similar to Fig. 5 with parts broken away of the similar operative structure for the other of the twin meter mechanisms, with both mechanisms being shown in the "violation position";

Figs. 19 and 20 diagrammatically illustrate respectively the use of twin meters of the present invention with angular or "head-on" parking spaces and parallel parking spaces; and Fig. 21 is a vertical sectional view of a meter unit of the present invention illustrating a possible mounting of the entire mechanism upon a hinged back closure plate.

Prior to the present invention it has been a common practice to control street parking spaces arranged either parallel or angularly to the curb or at the center of a broad street, each by a separate parking meter unit consisting of an encased mechanism supported upon a post or standard located adjacent the individual parking space. As a result a large number of relatively closely arranged devices must be installed and maintained which are not only costly but tend to present an unsightly appearance and constitute a serious fire hazard. These and other difficulties and undesirable features of common practice are effectively reduced and alleviated by the present invention which comprises a plural parking space meter adapted to be mounted on a standard in the vicinity of the division between two or more adjacent parking spaces for control of all, but each individually in accordance with manipulations by the person desiring to rent a particular parking space. Accordingly, by use of the present invention the initial cost of meters to a municipality, and the cost of service and maintenance, collection, installation and the like can be greatly reduced, e. g., as much as fifty percent with an installation of about one-half of the number of units spaced at twice the usual distance with each meter device controlling two adjacent parking spaces.

In accordance with the present invention a plural parking space meter is provided for control of adjacent parking spaces, however arranged, which includes a single casing having two or more indicator windows, one for each parking space, and through which separate movable time interval indicators are adapted to be exposed. Within the casing is mounted two or more coin-controlled mechanisms each associated with one of the indicators for operating it independently of the other indicator and a single power unit timed to operate both of the mechanisms. The casing is also equipped with two or more coin slots or other suitable means to introduce a coin selectively into coin chutes associated with the slots. Separate means are associated with each chute to cause a predetermined operation of one of the mechanisms independently of others upon passage of a coin through the chute with which that particular means is associated, and coin collection means, such as a single collection box, is provided in the casing to serve both of the chutes.

The operating mechanisms may be either of the automatic type wherein deposition of a coin in a slot initiates and controls meter operation, or of the manual type wherein a coin deposited in the meter may act as a key to cause manipulation of the mechanism upon manual rotation of a control shaft.

The independent operation of the two or more meter mechanisms may, by way of example, be had either by causing a speed-controlled power-unit drive to be drivingly connected to the mechanism at the beginning of the parking time interval and disconnected therefrom at the end of the parking time interval, such as through suitable clutch means, or each of the plurality of meter mechanisms may be provided with a driving connection to the power unit by suitable slipping clutch means such as a friction clutch and controlled in its operation by coin-controlled stop means whereby operation upon deposition of a coin will move a stop to a point permitting movement of an indicator to a predetermined point during a parking time interval.

By way of example, such a manual plural parking space meter may be provided with a single clock unit to drive at a predetermined rate of speed a pair of members each of which frictionally engages, such as by friction clutch means, a separate time interval indicator to move it, e. g., rotationally to carry it therewith. With each indicator may be associated an angularly movable stop pin against which it may abut and suitable mechanism whereby deposition of a coin into the one of the two slots designated for a particular parking space desired to be occupied by a person and manual rotation of an arm- or knob-equipped shaft may cause simultaneous winding up of the main spring of the clock and movement of the stop of that particular mechanism to carry therewith its indicator to an initial parking time interval point after which, upon release of the manual handle or knob, the stop is returned by a biasing spring means almost immediately to its initial position, there to await the arrival of the indicator moved slowly theretoward at a timed speed by means of the friction clutch means connected to the clock mechanism, and there to stop the indicator at the "violation position" for a repetition of the operation. Each of the meter mechanisms is thus independently operated in a similar manner from the single power and timing or clock unit, each being controlled in its operation separately by deposition of a coin or coins in slot and chute associated therewith and by manipulation of the common manual handle or knob.

The present invention may also be practiced with automatic meter mechanism as is illustrated by way of example in the attached drawings and the description here following, wherein like numerals refer to like parts throughout, each single time interval indicator operating mechanism being somewhat similar to that disclosed in the pending application of Eugene Kramer, Serial No. 429,858, filed February 7, 1942.

The twin parking space meter embodiment shown by way of example in the drawings comprises a single parking meter casing 22 which may be suitably mounted upon a standard or post 23, the front face of which as shown in Fig. 1 is provided with a pair of coin slots 24 and 224 and a pair of indicator windows 25 and 225 through each of which is visible a time scale upon which is marked a certain time interval such as sixty minutes which may comprise minute markings reading vertically from top to bottom from zero to sixty minutes. Each time scale may be vertically movable so that the portion thereof exposed in its window may indicate the purchased parking time remaining, or each time scale may be associated with a vertically movable shutter or signal flag adapted gradually to cover an increasingly larger portion of the time scale with the exposed portion of the time scale indicating the purchased parking time remaining.

By way of example, the mechanism shown in drawings is provided within the casing with a pair of fixed time scales 26 and 226 each of which is fully disclosed to view automatically upon the deposition of a coin of larger denomination, herein exemplified as a nickel, in the particular coin slot associated therewith. For clarity of description the operation of only one of the twin mechanisms, such as that located on the right in Figs. 1 and 2, will first be described, which controls the parking space to the right of the twin meter unit. As time elapses a shutter or signal flag 27 is moved upwardly over the fixed scale 26 from the bottom so that the exposed portion of the scale in connection with the figures thereon indicates at any moment the purchased parking time remaining to the renter of the parking space. At the right hand side of the casing, as shown in Fig. 2, there is a coin exhibiting window 28 to permit inspection of the coin deposited by the purchaser of parking time for the right hand parking space.

The rear of the casing 22 may be provided with a back closure plate 29 hinged as at 30 fitted with a latch or lock 31 to hold it in closed position as shown in Fig. 3. This hinged closure plate 29 is preferably provided with a pair of windows 32 and 232 through which there may be exposed to view auxiliary time interval scales or shutters 33 and 233 respectively adapted to indicate to the rear of the twin meter unit the same time intervals as are indicated by the time scales 26 and 226 in the front for convenience of the parking space purchasers and for checking by a police officer or others.

The front of the casing 22 is preferably provided with a key controlled hinged door 35 as shown in Fig. 1, to permit removal of coin collection means serving both meter mechanisms and the pair of chutes associated therewith, such as a common receptacle 36.

In Fig. 5 is shown a mechanism inside the casing 22 as it would appear from the right side thereof with the right hand side of the casing as viewed in Fig. 1 removed or as the mechanism might appear from that side when hinged out of the casing with the back closure plate 29 as indicated in Fig. 21 wherein the mechanism is mounted upon the cover plate. As shown in Figs. 2, 5, 12, 13 and 21, this mounting may be accomplished by providing the cover plate 29 with a pair of fixed channel members 37, 37 between which and the inner face of the closure plate 29 it is adapted slidably to receive a pair of flanges 38, 38 formed on the edges of a pair of spaced apart plates 39, 39 between which is supported a power unit 40 which may comprise the mechanism of an eight-day clock having a single drive shaft 41 with opposite ends thereof extending through plates 39, 39 and preferably fitted on the right side with a driving pinion 42 and on the left side with a similar driving pinion 242 for preferential mounting of the common power unit between the two indicator mechanisms. The plates 39, 39 may be suitably spaced apart by sleeves 43—43 through which are received assembly bolts 44—44 extending through the plates 39, 39 and carrying spacing sleeves 45—45 which together with the bolts 44—44 support each of the twin mechanisms upon and suitably space them from the supporting plates 39, 39.

Referring by way of example to the right hand coin-controlled time interval indicator operating mechanism as viewed in Figs. 2 and 5, this structure comprises an outer mounting plate 46 upon which is pivotally mounted at 47 a purchased-time control lever 48 constantly urged counterclockwise or to the rear of the meter by a tension spring 49 having one end secured to a pin mounted upon the plate 46 and the other end secured to a pin mounted upon the lever 48. Springing movement of the time control lever 48 is limited by a stop pin 50 fixed on the lower end of a right hand branch portion 51 of the lever 48 and received for arcuate movement in a travel limiting slot 52 provided in the mounting plate 46. The inner end of pin 50 projects through slot 52 beyond the inner face of the plate 46 into a coin engaging position whereby to be operated by a coin of larger denomination such as a nickel as will hereinafter be more fully explained.

The branch portion 51 of lever 48 is provided just above pin 50 with a projecting locking lug 53 to engage with a hooked end 54 of a locking lever 55 pivoted at 56 to support plate 46. With the parts in the position shown in Fig. 5 the hooked end 54 of lever 55 rests by gravity on the lug 53 so that when the lever 48 is swung clockwise the hooked end 54 will drop down into the position shown in Fig. 16 to maintain the lever 48 in its extreme position toward the front of the meter mechanism until the lever 55 is again raised to its upper unlatched position shown in Fig. 5.

Control lever 48 is provided, such as at 47, with a substantially horizontally extending cam arm 57 in angularly fixed relation thereto so as to be swung therewith. The end of the cam arm 57 is provided at its free end with a camming projection 58, the highest point of the surface of which is at the top as shown in Figs. 4 and 14 to control the position of a coin diverting lever 59. The coin diverting lever 59 is generally U-shaped and has a vertical pivot pin 60 extending through and pivotally supporting both a cam following arm portion 61 and a coin diverting portion 62 between a pair of lugs 63, 63 fixed on the plate 46 whereby the coin diverting portion 62 can be swung into and out of a slot 64 in plate 46 into the path of coins inserted through coin slot 24 upon swinging movement of cam lever 57 as carried by control lever 48. A helical spring 65 surrounding the pivot pin 60 bears at one end against the coin diverting portion 62 and at the other end against the mounting plate 46 thereby constantly biasing the coin diverting portion 62 into coin diverting position in slot 64. With the parts shown in Fig. 5 in the position therein indicated the cam arm 57 is in its lowermost position with the cam 58 acting to hold the coin diverting portion 62 of the diverting lever 59 out of the slot 64 in non-coin diverting position as indicated in Fig. 8 and the coin diverting positions of these parts is indicated in Figs. 13 and 14.

As shown in Fig. 5, the control lever 48 is also provided with a downwardly extending time control left hand branch portion 66 provided with an arcuate riding surface 67 terminating at one end in a "penny position" shoulder 68 and terminating at the other end in an abutment face 69 for the "nickel position." Arcuate slot 70 formed in the supporting plate 46 permits projection therethrough of a pin 71 carried by a toothed portion 72 of a segmental gear 73 with the teeth thereof extending over about one-third of its circumference. Segmental gear 73 is pivotally mounted at 74 to and behind the supporting plate 46 so that the pin 71 can be swung through the slot 70 from the "violation position" shown in Fig. 5 to the "nickel position" indicated in Fig. 10 in which latter position the pin 71 abuts against the face 69 of the time control portion 66.

Movement of the pin 71 from the "nickel position" as shown in Fig. 10 to the "violation position" shown in Fig. 5 is caused by timed driving of the toothed portion 72 of the segmental gear 73 from a clock mechanism such as at 40 by the drive shaft 41, driving pinion 42 fixed thereon and a movable idle wheel 75 adapted simultaneously to mesh with the driving pinion 42 and the toothed section 72 of the driving gear 73. Relatively rapid reset movement to the "nickel position" of pin 71 is obtained by a dropping by force of gravity of the shutter or flag 27 which is supported at 76 by pivotal connection to a link 77 pivotally carried at 78 by the end of an arm 79 fixed to the segmental gear 73 to be swung through an arc therewith. In slow timed arcuate clockwise movement of the segmental gear by the idle wheel 75 from the driving pinion 42 the arm 79 is moved through an arc from the full line position shown in Fig. 10 to the dotted line position shown in Fig. 5, thereby carrying a shutter or flag 27 from the "nickel position" to the "violation position" through a purchased parking time period.

Although not essential to use of the shown embodiment of the mechanism of the present invention, it may be desirable to have the parking time interval similarly indicated to the rear of the encased structure which may be accomplished by supporting flag 33 for movement upwardly gradually to cover a fixed time interval scale exposed opposite the window 32, and this may be accomplished in a simple manner by providing a projection 80 on the rear shutter 33 with a horizontal slot 81 in which is slidably received a pin 82 fixed on the end of a lifting lever arm 83 pivoted at 84 to the supporting plate 46 and having a projecting portion 85 bearing against the pin 71 so that when the pin 71 is in an upper position it permits the shutter 33 to drop by gravity to a purchased parking time interval and then as the pin 71 is slowly lowered by the segmental gear 73 gradually to cause the lever arm 83 to raise the shutter 33.

As previously indicated the idle wheel 75 connects the continuously rotating pinion 42 with the segmental gear 73 by meshing with the toothed portion 72 thereof when a coin operates on pin 50 to swing the arm 48 toward the front of the mechanism. As will be seen from Fig. 5, when the parts are in the "violation position" the idle wheel 75 will have passed meshing engagement with the toothed portion 72 of the segmental gear 73 and although at this point the clock continues to rotate the drive shaft 41 and the idle wheel 75 therewith, the latter cannot rotate the segmental gear 73 farther. For the purpose of meshing the idle gear 75 with the toothed portion 72 of the segmental gear 73 and positively disconnecting it therefrom, the idle wheel, as shown in Fig. 17, is movably carried by a lever arm 86 by means of a pin 87 upon which the idle wheel 75 freely rotates. The lever arm 86 is provided at 88 to the rear side of the plate 46, preferably to be located between the plate 46 and an adjacent rear mounting plate 89 in which is formed a slot 90 for free up-and-down movement of the idle wheel 75 as is indicated in Fig. 10. As shown in the latter figure, the rear plate 89 is provided with ribs 91, 92 and 93 to cooperate with the supporting plate 46 to form a coin chute or passage 94 leading from the coin receiving slot 24 in the casing past the coin diverting lever 62, adapted to project into a slot 95 in the plate 89, and past the coin engaging pin 50 downwardly to an exit 96 located above coin receiving means such as a receptacle 36 preferably by alignment with a slot 97 in a cover thereof.

The coin-controlled mechanism includes meter operation initiating structure adapted to be manipulated by passage of a coin down through the chute 94. This includes a horizontal rock shaft 98 pivotally mounted in a horizontal position by ears 99, 99 fixed to the rear face of the plate 89. The rock shaft 98 carries a downwardly extending actuating arm 100 fixed thereto to rock shaft 98 and a portion of that arm extends through an opening 101 in plate 89 into the chute 94 adjacent the position of the coin engaging pin 50. Preferably supporting plate 46 is also provided with a complementary slot 102 so that the actuating arm 100 may extend across the coin chute 94 so that as a coin passes down the chute it will cause the actuating arm 100 to be swung out of the slots 101 and 102 and rock the shaft 98 against biasing action of a tension spring 103 having one end fastened to the rock shaft such as by a collar 104 and the other end fastened to the plate 89. The rock shaft 98 will be caused to be actuated by a coin travelling down the chute 94 regardless of the denomination of the coin, e. g., whether it be a penny or a nickel.

The rock shaft 98 also carries a second arm 105 fixed thereto such as by collar 104, and this arm extends downwardly to terminate in a coin supporting shoulder 106 extending through slots 107, 107 in plates 46 and 89 across the chute 94 adjacent the exit 96 thereof so as to support a coin directly opposite the windows 28 to be exposed to view therein through an aperture 108 in plate 46. Thus as a coin drops down the chute 94, it will, upon engaging and passing arm 100, swing the latter out of the path of the chute and rotate the rock shaft 98 so that arm 105 will carry the coin supporting shoulder 106 out of the exit end of the coin chute to drop the preceding coin exposed to view in the window 28 into the coin receptacle 36 and then to be returned to coin supporting position by the spring 103 prior to arrival at the exposed position opposite the opening 108 of the coin which actuated the arm 100. It will be noted from Fig. 4 that the end 109 of the arm 105 beyond coin supporting shoulder 106 is bent downwardly and outwardly so that as the preceding coin leaves the supporting shoulder and drops by gravity it cams the arm 105 inwardly thus aiding the actuating arm 100 in its rocking actuation of the shaft 98 by movement of the next succeeding coin therepast.

A third arm 110 is mounted for limited rocking movement on the shaft 98 by means of a hub 111 which has fixed therein a projecting pin 112 as shown in Figs. 6 and 7, which rides within a notch 113 provided in the upper side of a collar 114 fixed on the rock shaft 98 with the pin 112 cooperating with the ends of the notch 113 permitting limited rocking movement of the arm 110 on the shaft 98.

The arm 110 is a cam arm whose function is to raise and lower the pivoted arm 86 carrying the idle wheel 75 and thus to connect the clock drive to and disconnect it from the segmental gear 73. For this purpose cam arm 110 is provided at its lower end with an angularly upwardly extending slot 115, one surface 116 of which serves as a camming surface for cooperation with a cam follower 117 comprising a reduced end portion of the lever 86 as shown in Fig. 10. Accordingly, with the lever 86 located between the plates 46 and 89, both plates are slotted as shown at 118 to permit arm 110 to cooperate with lever 86.

Referring particularly to Figs. 6 and 7, it is seen that when the cam arm 110 rocks in a counter-clockwise direction as viewed in these figures, upon counter-clockwise movement of shaft 98 by the coin operated actuating arm 100, that the idle wheel carrying arm 86 will be lifted to the position shown in Figs. 7 and 16 thereby lifting the idle wheel 75 out of meshing engagement with driving pinion 42 and from a position to engage the teeth 72 of segmental gear 73. When the cam arm 110 is rocked clockwise the arm 86 will be returned to its lower or gear-engaging driving position indicated in Figs. 6, 10 and 17. A locking shoulder 119 in the notch 115 positively holds the idle wheel carrying arm 86 in the gear-meshing position as shown in Figs. 6 and 10.

The cam arm 110 is normally urged into the gear-meshing position shown in Figs. 6 and 10 by one arm 120 of a substantially U-shaped member 121 pivotally mounted in an upright position by a pin 122 supported in ears 123, 123 fixed on plate 89 with a biasing spring 124 about the pin having one end engaged behind a portion of U-shaped member 121 and the other end abutting against plate 89. The arm 120 of member 121 is provided with an angularly arranged end portion 125 which engages behind the cam arm 110 to act as a positioner thereof. The member 121 is formed with another substantially upright arm 126 which acts as a shutter or flag supporting member.

Arm 120 being biased by spring 124 tends to urge cam arm 110 to the gear-meshing position. When the cam arm 110 is rocked to the position shown in Fig. 7 by rocking of the shaft 98 when a coin passes actuating arm 100, the cam-positioning arm 120 and shutter or flag supporting arm 126 are forced away from the supporting plate 89 by movement of the cam arm 110 and as soon as the coin has passed actuating arm 100 the biasing springs 103 and 124 cooperate to return cam arm 110 to the gear-meshing position.

The flag or shutter supporting arm 126 as shown in Fig. 9 is provided near its upper end with engaging teeth or the like 127 and the shutter or flag lifting arm 79 fixed to the segmental gear 73 is provided with cooperating means, such as a lug 128, which, when the arm 79 reaches its uppermost position, will ride into engagement with teeth 127 whereby the arm 126 will support and hold the shutter in the "violation position." This arrangement effectively prevents any slight movement of shutter or scale that might otherwise occur due to the fact that in this position of parts the idle wheel 75 has reached the end of the toothed section 72 of the segmental gear 73 but is still rotating since it is still in mesh with driving pinion 42 of the clock mechanism, these parts thus being in the positions indicated in Fig. 5.

Referring to Figs. 4 and 13, the opening 95 in plate 89 opposite the coin diverting arm 62 leads to a coin by-pass passage 129 which extends generally downwardly and is formed by cooperation of a sheet metal trough 130 cooperating with the outer face of the plate 39 and throated and shaped as shown in Figs. 4, 11 and 13, with the bottom end thereof at 131 providing an exit arranged over an opening or slot 132 in the coin box 36, but if desired may be led to an exit slot in the casing for return of diverted coins to the depositor.

It will be evident that if a nickel's worth of parking time, such as sixty minutes, has been purchased, as long as there is more than a period of say twelve minutes purchasable by a penny still showing on the time scale, it would be undesirable to have a penny travel down the coin chute 94 and displace the nickel opposite the coin inspection window 28. The coin diverter 62 and chute 130 accomplish these results. On the other hand, if the flag or shutter and time scale indicate that there is less than twelve minutes parking time remaining, then if the next purchaser deposits a penny it should reset the shutter for the full twelve minute period and displace the preceding coin visible at window 28 regardless of its denomination.

The above described single time-interval indicator operating mechanism operates as follows: Normally the shutter or flag 27 is at its topmost position which may be termed the "violation position" wherein no purchased parking time is indicated. All of the parts are then in the position shown in Fig. 5 and the idle wheel 75 is being rotated through driving pinion 42 by clock mechanism 40 but since it is beyond the terminus of the toothed section 72 of the segmental gear 73 there is no driving of the indicator operative mechanism through segmental gear 73. If a nickel is deposited in slot 24 it passes down the coin chute 94 past coin diverter 62 which is being held out of coin diverting position by the high part of cam 58, then past actuating arm 100 rocking the latter to the right as viewed in Fig. 14 and thence on down the coin chute to the supporting shoulder 106 at the viewing aperture 108. As the coin passes the position of actuating arm 100, the edge thereof engages the pin 50 projecting through slot 52 into the path of the coin down the chute and the diameter of the nickel is such that in order to pass pin 50 the latter must be moved in the slot 52 to the left as viewed in Fig. 5, thereby rocking time control lever 48 clockwise or toward the front of the meter far enough to permit the hook 54 to drop to locking position over lug 53 and retain lever 48 in the position shown in Fig. 16.

At the same time the rocking of actuating arm 100 by the passage of the nickel to the dotted line position shown in Fig. 14 causes rock shaft 98 to move the coin-retaining shoulder 106 on the arm 105 out of the chute exit end 96, thereby permitting any coin that had been supported at the aperture 108 to drop through the slot 97 into the coin box 36 with the latter coin as it passes the curved end 109 of the arm 105 aiding in this rocking movement of the structure. This rocking movement of rock shaft 98 also causes rocking of cam lever 110 from the position shown in Fig. 6 to the position shown in Fig. 7 thereby lifting the idle wheel supporting arm 86 from the position shown in Fig. 5 to the position shown in Fig. 16 thereby lifting the idle wheel 75 out of mesh with both the constantly rotating driving pinion 42 and the toothed section 72 of segmental gear 73. This movement of the cam lever 110 from the position shown in Fig. 6 to the position shown in Fig. 7 rocks the arms 120 and 126 of the U-shaped member 121 away from the back supporting plate 89 so that lug 128 on the flag supporting lever 79 which holds the flag 27 to the "violation position" is freed from engagement with the teeth 127 and as a consequence the shutter or flag 27 and the parts linked thereto are permitted by force of gravity to fall to the "nickel position." As shown in Fig. 10 the arm 79 rotates the segmental gear 73 to a position where the initial part of the toothed section 72 is brought adjacent to the idle wheel 75. At the same time segmental gear 73 carries pin 71 from its bottom position as shown in Fig. 5 through the position shown in Fig. 16 to the position shown in Fig. 10 with the pin 71 engaging against the abutting face 69 on the time control lever 48 and in its movement as indicated in Fig. 16 it will be seen that pin 71 travels past the "penny position" shoulder 68. As a result of this upward movement of pin 71 the rear shutter 33 is permitted by pivoted movement of arm 83 to drop to a similar parking time interval position. As the pin 71 reaches its uppermost position it engages the locking lever 55 just prior to abutting against face 69 of lever 48 to disengage hook 54 from lug 53. Spring 49 is thus permitted to move time-control lever 48 counter-clockwise or to the rear with the abutting face 69 and curved face 67 against or engaging pin 71 to cause coin-engaging pin 50 to be moved in slot 52 back toward the initial position in the coin chute where it will be engaged by a coin of greatest diameter.

As the deposited nickel drops below the end of actuating arm 100, the latter is restored by the spring 103 to its former position projecting into and across the coin chute and accompanying movement of rock shaft 98 restores coin-supporting shoulder 106 into coin-supporting position across the chute exit 96 there to receive, stop and support the oncoming nickel by the time it there arrives. This restoration of the rock shaft 98 causes pin 112 on the collar 114 to return to its initial position and the spring 124 shown in Fig. 17 restores arms 120 and 126 to their initial positions with the arm 120 moving the cam lever 110 from the position shown in Fig. 7 to that shown in Fig. 6 thereby permitting the idle wheel carrying arm 86 to drop to driving position shown in Fig. 10 with the idle wheel 75 meshed both with the clock driving pinion 42 and the toothed section 72 of segmental gear 73. Thus the clock mechanism will immediately start rotating the segmental gear 73 carrying upwardly with it arm 79 and link 77 thereby gradually to move the shutter 27 upwardly to indicate elapse of purchased parking time and at any instant the amount of purchased parking time remaining until the "violation position" is reached where lug 128 on shutter operating arm 79 engages with the teeth 127 on the shutter supporting arm 126.

The pin 71 on segmental gear 73, in moving to its uppermost position, lifts the locking lever 55 but it will be seen from Fig. 15 that the time control lever 48 will not be pulled by the spring 49 to its extreme rearmost position until pin 71 has moved off from engagement with the curved surface 67 and has passed below the shoulder 68 with this occurring at the moment the shutter covers all of the time scale except that period purchasable by the coin of smaller denomination, such as a penny, which by way of example will be twelve minutes parking time. During the first forty-eight minutes time-control lever 48 is not permitted by the surface 67 engaging pin 71 to move fully to the rear to the position shown in Fig. 5. As a consequence the cam lever 57 is not fully lowered and the high part of cam 58 has not been brought to a position to move lever arm 61 outwardly to carry coin diverting lever 62 out of coin diverting position across the coin chute 94. Accordingly during this initial forty-eight minute period, the coin diverting lever 62 is in a diverting position whereby any pennies deposited in the slot 24 will be diverted to the chute 129 which may lead to a return slot. The opening 95 in the side of the chute 94 through which the diverter 62 directs the pennies is sufficiently small to prevent the passage of a nickel into the chute 129.

With but twelve minutes parking time remaining, the pin 71 passes shoulder 68 thereby permitting return spring 49 to return time control lever 48 to its rearmost position carrying cam lever 57 downwardly so that the cam 58 causes the coin diverting arm 62 to be pivoted out of coin diverting position. Thus at any moment during this last twelve minute period of upward travel of the shutter or flag signal, the deposition of a penny in the coin slot will cause the actuating arm through cam lever 110 to lift idle wheel 75 out of mesh with driving pinion 42 and segmental gear 73, thereby permitting the flag or shutter to drop down by force of gravity carrying segmental gear 73 backwards until pin 71 engages the shoulder 68 with the shutter or flag dropped to the "penny position" and with the parts in the position indicated in Fig. 15. The diameter of the penny is enough less than that of a nickel so that the penny passes down the coin chute beyond the actuating arm 100 without moving pin 50 in slot 52 thereby avoiding movement of time control lever 48. As pin 71 reaches engagement with the shoulder 68 and the penny passes beyond the end of actuating arm 100, the latter and the rock shaft 98 are restored to initial position by the springs 103 and 124 with the cam lever 110 pushed from the position shown in Fig. 7 to the position shown in Fig. 6 whereby the idle wheel 75 is dropped down into driving meshing position with respect to the toothed section 72 of segmental gear 73. During the upward travel of the shutter or flag 27 over the last twelve minute period from the "penny position," the time control lever 48 is in a rearward position with the coin diverting arm 62 held out of coin diverting position so that at any time during this last twelve minute period another penny inserted in the coin slot will be permitted to pass down the coin chute and reset the meter to the "penny position" for a full twelve minutes, but regardless of where the shutter or flag signal is located at any particular time a nickel deposited in the slot will cause the shutter eventually to drop down to the "nickel position" thereby indicating on the time scale the purchase of a full sixty minutes of parking time.

The above described indicator controlling and operating mechanism is as indicated adapted for control of a parking space which may be to the right of the twin parking meter as viewed from the front, for example, the space 133 in Fig. 19 or space 134 in Fig. 20. As previously indicated, the meter casing also encloses another indicator controlling and operating mechanism associated with the left hand side indicator for independent control of an adjacent parking space such as 135 in Fig. 19 or 136 in Fig. 20. Obviously such twin meter structure may be utilized to control any adjacent parking spaces regardless of their relative arrangements. The mechanism on the left side of the twin meter shown in the drawings, as is indicated in Fig. 18, is similar to that described above but with parts in reverse so that the indicators operated thereby may be mounted side by side on the same face of the meter such as to be viewed from the front as indicated in Fig. 1, and obviously the operation of the mechanism on the left side is similar to that outlined above in connection with the mechanism on the right side. The parts of this left hand mechanism have been given numerals similar to those for the similar parts of the right hand mechanism in a two-hundred higher series of digits, and it will be seen from Fig. 2, for example, that the common drive shaft 41 of the clock mechanism 40 carries a driving pinion 242 on the end thereof opposite to the end on which the driving pinion 42 is carried for operation of the first described mechanism. A movable idle wheel 275 similar to idle wheel 75 is meshed with driving pinion 242 in a similar manner to operate the left hand shutter or time interval indicator moving mechanism.

It will be noted from Figs. 11 and 18 that a passage 137 is preferably formed through one side of the casing 22 such as from the left hand side thereof to extend successively through plates 246 and 289, chute 330 and power unit supporting plate 39, so that a key may be inserted to engage with a spring winding shaft 138 to permit winding of the main spring of the clock mechanism. While it is at present preferred to provide as the power unit of the illustrated twin meter an eight-day clock mechanism to be wound by the authorized collector of coins when he empties the coin collecting means or receptacles, other speed-controlled power units or clocks may be used; and parking time intervals other than those indicated may be purchased with similar coins, or coins of other denominations may be utilized to obtain similar operations, as will be obvious to one skilled in the art.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A plural parking space meter for control of at least two adjacent parking spaces comprising, in combination, a casing having a plurality of indicator windows one for each parking space, a plurality of movable time interval indicators with each adapted to be exposed in one of the windows, a plurality of coin-controlled mechanisms each associated with one of said indicators for independently operating it, a single power unit to operate each of said mechanisms at certain speed, a plurality of coin slots in said casing, a plurality of coin chutes with each associated with one of the coin slots, means associated with each chute to cause upon passage of a coin through the latter a predetermined operation of one said mechanism independent of the others, and coin collection means in said casing to serve all of said chutes.

2. A twin parking meter for control of two adjacent parking spaces comprising, in combination, a casing having a pair of indicator windows one for each parking space, a pair of movable time interval indicators with each adapted to be exposed in one of the windows, a pair of drive mechanisms each associated with one of said indicators for independently operating it, a single clock drive to operate both of said drive mechanisms, a pair of coin slots in said casing, a pair of coin chutes with each associated with one of the coin slots, means associated with each chute to cause upon passage of a coin through the chute one of said drive mechanisms to be driven from said clock drive for a predetermined time period independent of the other drive mechanism, and coin collection means in said casing to serve both said chutes.

3. A twin parking meter for control of two adjacent parking spaces comprising, in combination, a casing having a pair of indicator windows one for each parking space, a pair of movable time interval indicators with each adapted to be exposed in one of the windows, a pair of drive mechanisms each associated with one of said indicators for independently operating it, a single clock drive to operate both of said drive mechanisms, a pair of coin slots in said casing, a pair of coin chutes with each associated with one of the coin slots, means associated with each chute whereby upon passage of a coin therethrough the drive mechanism associated with that chute will have driven connection to said clock drive for a predetermined time period, and coin collection means in said casing to serve both said chutes.

4. A twin parking meter for control of two adjacent parking spaces comprising, in combination, a casing having a pair of indicator windows one for each parking space, a pair of movable time interval indicators with each adapted to be exposed in one of the windows, a pair of drive mechanisms each associated with one of said indicators for independently operating it, a single clock unit interposed between said drive mechanisms, a clock drive extending from opposite sides of said clock unit to operate both of said drive mechanisms, a pair of coin slots in said casing, a pair of coin chutes with each associated with one of the coin slots, means associated with each chute whereby upon passage of a coin therethrough the drive mechanism associated with that chute will have driven connection to said clock drive for a predetermined time period, and coin collection means in said casing to serve both said chutes.

5. A twin parking meter for control of two adjacent parking spaces comprising, in combination, a casing having a pair of indicator windows one for each parking space, a pair of movable time interval indicators with each adapted to be exposed in one of the windows, a pair of drive mechanisms each associated with one of said indicators for independently operating it, a single clock unit interposed between said drive mechanisms, a clock drive shaft extending from opposite sides of said clock unit to operate both of said drive mechanisms, a pair of coin slots in said casing, a pair of coin chutes with each associated with one of the coin slots, driving connecting means associated with each chute whereby upon passage of a coin therethrough the drive mechanism associated with that chute will be driven from said clock drive shaft for a predetermined time period, and coin collection means in said casing to serve both said chutes.

6. A twin parking meter for control of two adjacent parking spaces comprising, in combination, a casing having a pair of indicator windows one for each parking space, a pair of movable time interval indicators with each adapted to be exposed in one of the windows, a pair of drive mechanisms each having a driving gear and associated with one of said indicators for independently operating it, a single clock unit interposed between said drive mechanisms, a clock drive shaft having the ends thereof extending from opposite sides of said unit, a driving pinion on each end of said drive shaft, a pair of coin slots in said casing, a pair of coin chutes with each associated with one of the coin slots, driving connecting means including an idle wheel associated with each chute to cause upon passage of a coin through a particular chute the idle wheel to engage the driving pinion and driving gear of one of said drive mechanisms whereby the latter will be driven from said clock drive shaft for a predetermined time period independent of the other drive mechanism, and coin collection means in said casing to serve both said chutes.

7. A twin parking meter for control of two adjacent parking spaces comprising, in combination, a casing having a pair of indicator windows one for each parking space, a pair of movable time interval indicators with each adapted to be exposed in one of the windows, a pair of drive mechanisms each having a driving gear and associated with one of said indicators for independently operating it, a single clock unit interposed between said drive mechanisms, a clock drive shaft having the ends thereof extending from opposite sides of said unit, a driving pinion on each end of said drive shaft, a pair of coin slots in said casing, a pair of coin chutes with each associated with one of the coin slots, a pair of driving connecting means each associated with one of the chutes, each of said driving connecting means including a movably mounted idle wheel adapted upon movement to an engaging position to mesh with one of said driving pinions and the driving gear of the drive mechanism on the same side of the clock unit and means to cause upon passage of a coin through a particular chute the idle wheel associated with that chute to be moved to engaging position whereby said drive mechanism will be driven from said clock drive shaft for a predetermined time period independent of the other drive mechanism, and coin collection means in said casing to serve both chutes.

LOUIS F. FINK.